I. J. KISSELL.
CIRCUIT CLOSER FOR AUTOMOBILE SIGNALS.
APPLICATION FILED JUNE 19, 1918. RENEWED MAR. 13, 1920.
1,341,372.
Patented May 25, 1920.
2 SHEETS—SHEET 1.
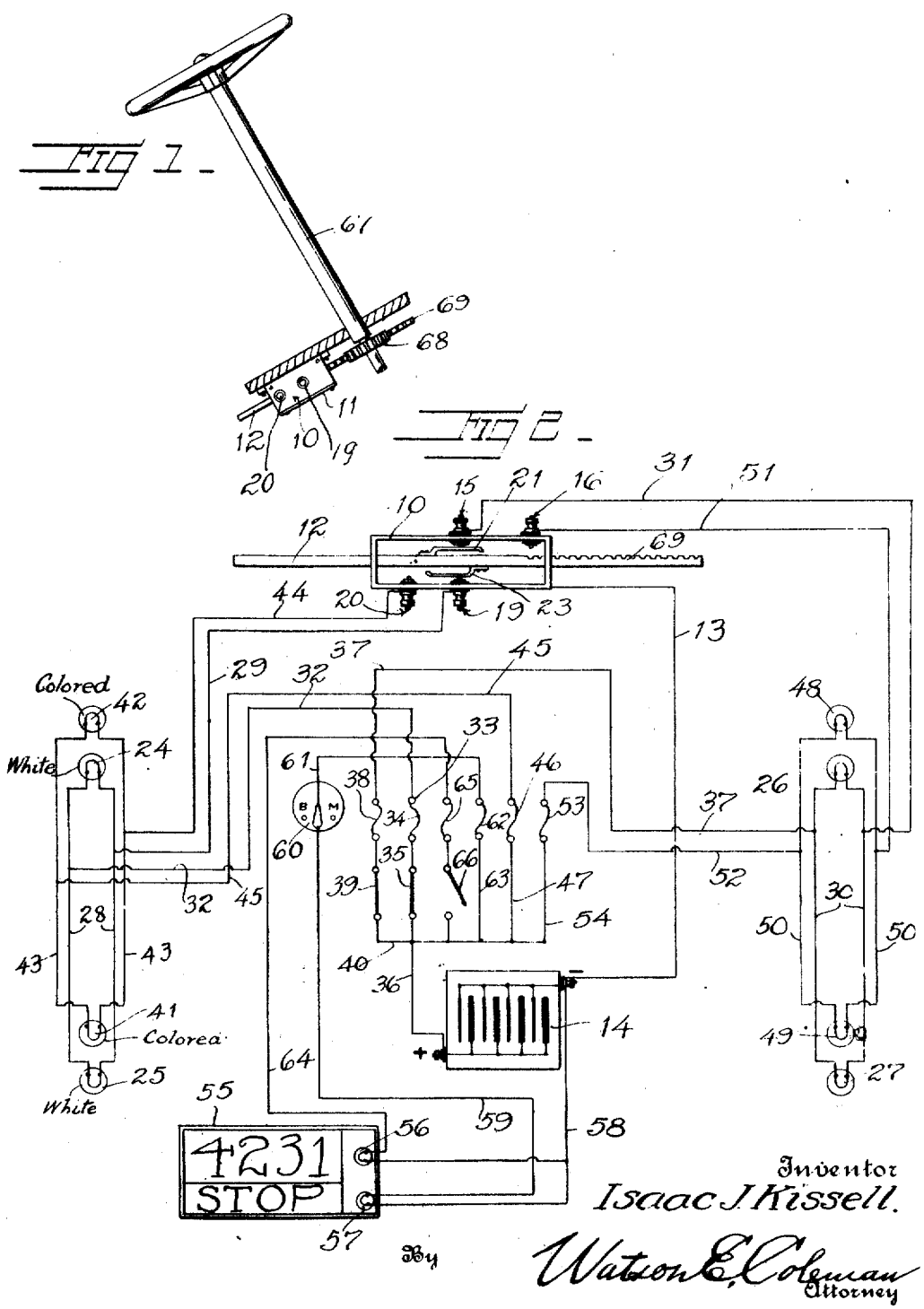
Inventor
Isaac J. Kissell.
By Watson E. Coleman
Attorney I. J. KISSELL.
CIRCUIT CLOSER FOR AUTOMOBILE SIGNALS.
APPLICATION FILED JUNE 19, 1918. RENEWED MAR. 13, 1920.
1,341,372.
Patented May 25, 1920.
2 SHEETS—SHEET 2.
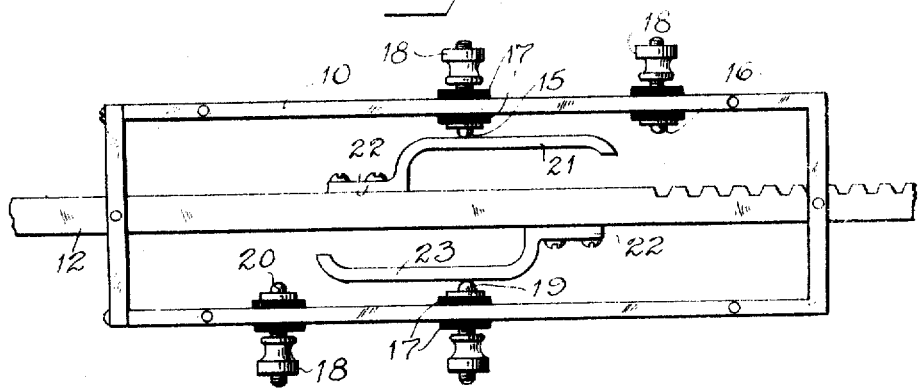
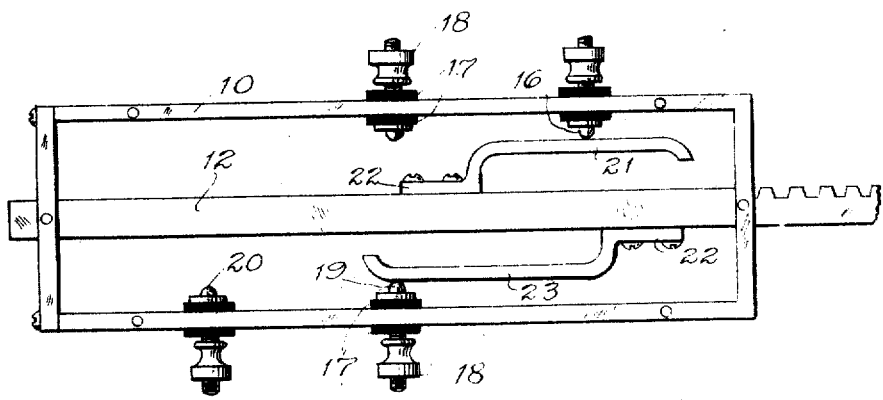
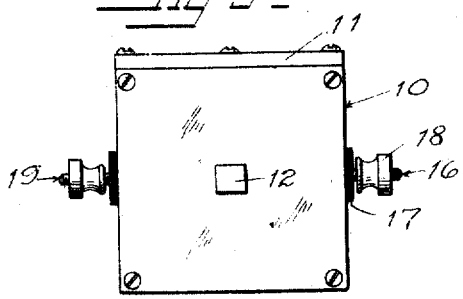
Inventor
Isaac J. Kissell
By Watson E. Coleman
Attorney

UNITED STATES PATENT OFFICE.

ISAAC J. KISSELL, OF COLORADO SPRINGS, COLORADO, ASSIGNOR OF ONE-HALF TO ARTHUR VINCENT SMITH, OF COLORADO SPRINGS, COLORADO.

CIRCUIT-CLOSER FOR AUTOMOBILE-SIGNALS.

1,341,372.   Specification of Letters Patent.   Patented May 25, 1920.

Application filed June 19, 1918, Serial No. 240,807. Renewed March 13, 1920. Serial No. 365,628.

*To all whom it may concern:*

Be it known that I, ISAAC J. KISSELL, a citizen of the United States, residing at Colorado Springs, in the county of El Paso and State of Colorado, have invented certain new and useful Improvements in Circuit-Closers for Automobile-Signals, of which the following is a specification, reference being had to the accompanying drawings.

This invention relates to automobile signal systems, and particularly to that class of signal systems wherein signal lights are disposed upon the forward and rear ends of the car, the lights being energized upon the turning movement of the car.

The general object of the invention is to provide a circuit control for a system of this character in which white lights are mounted upon the forward and rear ends of the car which are normally energized when the car is running straight and colored lights upon the forward and rear ends of the car which are normally deënergized but which are energized when the car turns to the right or to the left.

A further object is to provide a very simple form of circuit controller for deënergizing these lights which is operated automatically upon the turning of the steering wheels and in this connection to provide a switch which, when the car is turned to the right, for instance, will deënergize the white lights on the righthand side of the car, and energize the colored lights on the righthand side of the car, while leaving the white lights on the lefthand side of the car energized and vice versa.

Other objects will appear in the course of the following description.

My invention is illustrated in the accompanying drawings, wherein:

Figure 1 is a fragmentary elevation of a steering shaft and my switch box connected thereto;

Fig. 2 is a diagrammatic view showing the electrical connections between the switch box and the signal lights;

Fig. 3 and 4 are side elevations of the signal light switch mechanism showing the parts in two positions; and Fig. 5 is a rear elevation of the switch.

Referring to these drawings, 10 designates the casing which may be made of any suitable material, but which is preferably made of metal and preferably has a removable cover 11. Passing longitudinally through the casing and slidable therein is a switch rod 12, which is also metallic and which may be connected to the steering wheel or steering post of the vehicle in any suitable manner, or which may be connected to the knuckles of the steering wheels or connected to the steering rod in such manner that when the steering wheels are turned to the right, for instance, the rod 12 will be drawn in one direction from a neutral position and when the steering wheels are turned to the left, the switch rod will be shifted to the left from a neutral position. This box 10 is connected by means of a return or negative wire 13 to a battery 14.

Mounted upon one side of the box are the contacts 15 and 16, these contacts being formed by headed screws passing through the box and insulated therefrom by the insulating washers 17. Engaging the screws are the binding nuts 18 of any usual or suitable construction. On the opposite side of the box are disposed the contacts 19 and 20, which are of the same construction as the contacts 15 and 16 and are insulated from the box in the same manner and carry the binding screws 18. It will be noted that the contacts 15 and 19 are disposed directly opposite each other at the middle of the box, while the contact 16 is disposed adjacent one end of the box and the contact 20 is disposed adjacent the other end of the box or casing.

Coacting with the contacts 15 and 16 is an elongated contact member 21 which is of metal and has a base 22 from which the contact 21 is offset. The extremities of the contact are rounded inward toward the rod 12. Disposed upon the opposite side of the rod 12 and coacting with the contacts 19 and 20 is the contact member 23, which is constructed in the same manner as the contact 21. The contacts 21 and 23 project in opposite directions, and the bases 22 of these contacts are disposed on each side of the middle of the rod 12, that is, the neutral point of this rod.

Mounted upon the lefthand side of the machine are the forward and rear white or safety lights 24 and 25 and mounted on the righthand side of the machine are the forward and rear lights 26 and 27. The white lights 24 and 25 are connected in circuit with each other by the wire 28 from which a conductor 29 extends to the contact 19. The white lights 26 and 27 are connected to each other by the wires 30, and connected to the contact 15 by means of the conductor 31. From the circuit formed by the wires 28 extends a conductor 32, which leads to a binding screw 33, thence through a fuse 34 to a second binding screw, thence to a snap switch 35 and from this switch leads a conductor 36 to the battery 14. From the circuit formed by the wires 30 leads a conductor 37 which is connected to the fuse 38, thence to the snap switch 39 and thence by way of the conductor 40 to the wire 36 and to the battery.

Mounted upon the forward and rear ends of the automobile at the lefthand side are the colored danger lights 41 and 42, these lights being preferably colored red and connected in circuit with each other by the wires 43. From the contact 20 extends a conductor 44 which leads to one of the circuit wires 43 and from the other circuit wire 43 extends a conductor 45 which leads to a fuse 46 from which a conductor 47 leads to the wire 36. On the righthand side of the automobile, at the forward and rear ends are disposed the danger signal lights 48 and 49 connected in circuit with each other by the wires 50, these lights being preferably red, though not necessarily so. From the contact 16 extends a conductor 51 leading to one of the circuit wires 50, while from the other circuit wire leads a conductor 52, which extends to the fuse 53 and by means of the conductor 54 is connected to the wire 36 and thence to the battery.

Mounted upon the rear end of the automobile is a casing 55 having an illuminated license number plate and containing the tail lamp 56. Below the license number plate, there is a compartment displaying the word "Stop" or a word of like tenor and carried in this compartment is a signal lamp 57 behind a sheet of red glass. From the battery 14 extends a conductor 58 to the lamp 57 and from this lamp 57 extends a conductor 59 to the coil switch 60. From the coil switch 60 extends a conductor 61 which leads to a fuse 62 and thence by a conductor 63 to the conductor 36 and thence to the battery. The lamp 56 is connected to the conductor 58 and the lamp 56 is connected by the wire 64 to the fuse 65, the snap switch 66, and by wire 36 to the battery. The coil switch 60 is, of course, disposed in the ignition circuit of the car. When this coil switch is turned either to the battery or magneto, the circuit through the signal lamp 57 is broken, but whenever the coil switch is turned so as to cut off ignition, the circuit through the signal lamp 57 is completed, and this lamp is energized and the word "Stop" is illuminated.

When the vehicle is running in a straight line, the contact members 21 and 23 are in engagement with the contacts 15 and 19 respectively. As a consequence the white lights at the front and rear of the machine are all energized, but the colored lights are deënergized. Now if the rod 12 is shifted to the right in Fig. 3, as by the machine turning toward the right, the contact 21 will engage with the contact 16 and move out of electrical engagement with the contact 15, but the contact 23 will remain in electrical engagement with the contact 19. As a consequence of this movement, the red lights 48 and 49 on the righthand side of the machine will be energized, the white lights 26 and 27 on this side of the machine being deënergized. The white lights on the lefthand side of the machine, however, will remain energized and the colored lights on this side of the machine will remain deënergized. When the rod 12 moves back to its neutral position, the white lights will be again energized and the colored lights on the righthand side of the machine will be deënergized. When the rod 12 moves from its neutral position toward the left in Fig. 3, the contact 23 will leave the contact 19 and simultaneously have electrical engagement with the contact 20, thus completing the circuit through the red lights 42 and 43 on the lefthand side of the machine and deënergizing the white lights 24 and 25 on this side. The contact member 21, however, will still be in engagement with the contact 15 so that the circuit through the white lights on the righthand side of the machine will not be broken.

The white light circuits on both sides of the machine are controlled by the snap switches 35 and 39 so that these white lights may be turned off during the day or whenever desired. The circuit through the tail light 56 is also controlled by the snap switch 66. The colored signal lamps on the righthand and lefthand sides of the machine at front and rear and the stop signal lamp 57 are always left in condition to be energized or deënergized by the steering of the machine so as to use these signal lights during the day, as well as at night. Of course, snap switches might be provided for these circuits also. It will be seen that the switch rod 12 being metallic, is grounded through the box 10 and the wire 13 to the battery. Obviously, however, this return may be formed in any other desired manner.

It will be seen that this switch is extremely simple and positive in its operation. The contacts 21 and 23 are relatively long so that slight oscillations of the rod 12 caused by oscillations of the steering gear will not affect the signal lights. These contact members 21 and 23 are, of course, somewhat resilient so as to bear firmly against their respective contacts with which they coact.

It will be seen that with my signaling system, the car will display, under ordinary circumstances, two white signal lights at its front and two white signal lights at its rear, thus indicating to a vehicle approaching in either direction that the car is moving in a straight line along the road. As soon, however, as the car is turned in one direction or the other, the white signal lights on the side of the car toward which it is turned will go out and immediately the red signal lights will be displayed, thus indicating that the car is about to turn and the direction in which it is to turn.

While in the drawings I have shown a construction wherein there are two pairs of white lights disposed on each side of the car at the forward and rear ends thereof, and two pairs of colored lights disposed at each side of the car at the front and rear thereof, yet I do not wish to be limited to this as preferably I will dispense with the white lights at the rear end of the car and merely use the colored danger lights at the rear end.

The casing 55 has, as before stated, a compartment displaying the word "Stop" with a lamp 57 behind it. Preferably the word "Stop" will be put on a sheet of plain glass in red letters to be two inches high, the letters to be extending the full length of the compartment or casing and the letters are covered with a sheet of red glass so that the word "Stop" cannot be seen except when the light behind it is illuminated. By using the ruby glass over the word "Stop" the word "Stop" can be easily seen for a distance of 600 feet day or night.

I do not wish to be limited to any particular means for operating the rod 12 which controls the switch contacts 21 and 23, but as a simple means to this end, I have illustrated in Fig. 1, the steering shaft 67 as carrying upon it a gear wheel 68 which engages with teeth 69 on the rod 12 so that this rod 12 will shift in consonance with the movement of the steering wheel.

While I have illustrated a specific form of the switch mechanism and a specific arrangement of circuits, it is obvious that these may be modified in many ways without departing from the spirit of the invention as defined in the appended claims.

Having described my invention, what I claim is:

1. A circuit controller of the character described, including a longitudinally reciprocatable rod adapted to be operatively connected to the steering mechanism of a motor vehicle, a pair of contacts mounted adjacent the rod in transverse alinement, a second pair of contacts mounted one on each side of the rod and to the right and left respectively of the first named contacts, and contact members mounted on the rod and shiftable therewith, and disposed in offset relation and extending in opposite directions, one of said last named contact members coacting with one of the first named contacts, and the second named contact on the same side, and the other of the contact members on the rod coacting with the first named contact on the opposite side and corresponding second named contact, each of said contact members carried by the rod having a length equal to the distance between the coacting contacts on that side of the rod.

2. A circuit controller for automobile signaling systems, comprising a longitudinally reciprocating rod adapted to be operatively connected to the steering mechanism of an automobile, a pair of contacts mounted in transverse alinement, a pair of contacts disposed in diagonally related position to the right and left respectively of the first named contacts, and contact members mounted on the rod shiftable therewith and disposed in offset relation and extending in opposite directions, and adapted to be connected to a source of current, one of said last named contacts coacting with one of the first named contacts and the corresponding second named contact, and the other contact on the rod coacting with one of the first named contacts and the corresponding second named contact.

3. A signal controlling switch of the character described comprising a casing, a rod sliding therethrough and adapted to be operatively connected to the steering mechanism of a motor vehicle, a pair of contacts mounted on the casing in transverse alinement, a pair of contacts mounted on the casing to the right and left respectively of the first named contacts, and contact members mounted on the rod and shiftable therewith and disposed in offset relation and extending in opposite directions, one coacting with one of the first named contacts and the corresponding second named contact and the other with one of the first named contacts and the corresponding second named contact, each of said contact members having a length equal to the distance between the coacting contacts on that side of the casing.

4. A circuit controller of the character described including a longitudinally reciprocatable rod, contacts mounted adjacent the rod and in transverse alinement, and contact members mounted on the rod and shiftable therewith, said contact members each having a base portion attached to the rod and extending outward therefrom, and a portion extending parallel to the rod but spaced therefrom and adapted to engage said contacts, said spaced portions of the contacts being resiliently yielding.

5. A circuit controller of the character described including a casing, contacts carried on the opposite side walls of the casing and facing inward, a longitudinally reciprocatable rod mounted in the casing between said contacts, and contact members mounted on and carried by the rod engaging each with one of said first named contacts, said contact members each having a base, and a portion projecting outward from the rod and then longitudinally parallel thereto, the last named portion being somewhat resilient.

In testimony whereof I hereunto affix my signature in the presence of two witnesses.

ISAAC J. KISSELL.

Witnesses:
EDWARD BALZER,
NICHOLAS A. AUERT.